Figure 1:
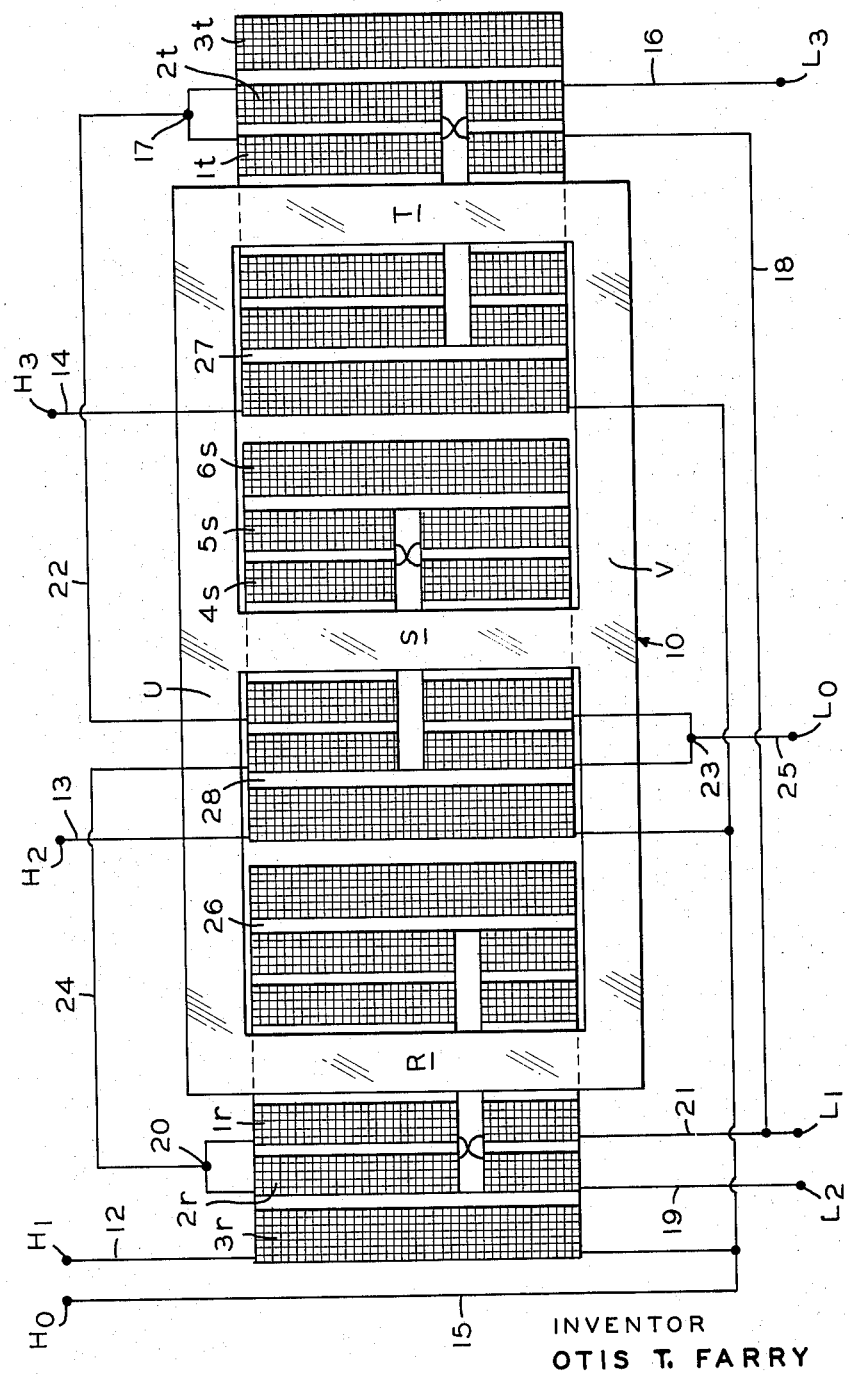

June 28, 1966  O. T. FARRY  3,258,725
POLYPHASE TRANSFORMER WITH A-WINDING ARRANGEMENT
Filed July 26, 1963  2 Sheets-Sheet 1

INVENTOR
OTIS T. FARRY
BY William R. O'Meara

June 28, 1966    O. T. FARRY    3,258,725
POLYPHASE TRANSFORMER WITH A-WINDING ARRANGEMENT
Filed July 26, 1963    2 Sheets-Sheet 2

INVENTOR
OTIS T. FARRY
BY William R. O'Meara

3,258,725
POLYPHASE TRANSFORMER WITH A-WINDING ARRANGEMENT
Otis T. Farry, University City, Mo., assignor to Wagner Electric Corporation, St. Louis, Mo., a corporation of Delaware
Filed July 26, 1963, Ser. No. 297,837
2 Claims. (Cl. 336—12)

This invention relates to polyphase transformers and more particularly to those used in connection with three-phase power transmission systems.

As herein used, the term "three-phase transformer" refers to either a single three-phase transformer having a single three-phase core or three single phase transformers with separate cores having their windings connected together to form a three-phase transformer.

In the transfer of electric energy from one three-phase system to another three-phase system, it is frequently desirable or necessary to establish a neutral on both systems.

One three-phase transformer winding arrangement which permits the use of neutrals on both sides of the transformer is the well known Y—Y winding connected transformer, i.e., the winding arrangement in which both the primary and secondary sides are connected in Y. However, it is generally necessary to include a tertiary winding connected in delta to stabilize the voltages from the neutral terminal to the three line terminals. The inherent disadvantages of the tertiary winding are the increase in size, cost, and losses of the transformer; and, in addition thereto, the delta connected tertiary is not completely effective in isolating the neutral or zero sequence currents of the system.

Another three-phase transformer winding arrangement which permits the use of a neutral on both sides of the transformer is the Y-delta winding arrangement in which a special grounding winding is used. For example, the well known zig-zag grounding winding may be used with the Y-delta transformer, the zig-zag winding being connected in parallel with the delta winding. With this arrangement, four windings are required on each leg of the transformer, a zig, a zag, a delta, and a Y winding. This increases the cost and maintenance. Also, it is usually not possible to make the current divide in the proper ratio between the delta and the zig-zag windings, and for this reason, the combined size of all windings is made larger than the rating of the transformer would indicate, and this increases the size and cost of the transformer. Another disadvantage of this type of transformer is that, as usually constructed, the neutral or zero sequence currents of the two winding sides are not completely isolated from one another.

Still another known three-phase transformer arrangement which permits the use of a neutral on both sides of the transformer is one in which one side of the transformer is connected in Y and the other side in A, i.e., in the form of the letter A in vector diagram. While this winding arrangement provides a connection for neutrals on both sides of the transformer, it has not heretofore been practical because the windings that make up the A-winding side differ from one another. With symmetrical phase and line voltages could be obtained under no-load conditions, the differences of the windings of the A-connected side of the transformer when under load conditions would cause unbalanced percentage reactances in the three phases, measured from line to neutral and measured from line to line, which would result in unbalanced line-to-neutral voltages and unbalanced line-to-line voltages even when the transformer was supplying power to a balanced load. Also, with normal construction there would be some zero sequence coupling between the Y and A connected windings.

It is therefore an object of the present invention to provide an improved three-phase transformer which may be provided with neutrals on both sides of the transformer while avoiding the abovementioned disadvantages.

Another object of the present invention is to provide a three-phase transformer having one side connected in an A-winding arrangement, and wherein the line-to-line voltages and line-to-neutral voltages are symmetrical under load conditions.

Another object of the present invention is to provide a three-phase transformer having one side connected in an A-winding arrangement wherein the regulation in all phases, as measured from line to neutral is alike, and measured from line to line is alike.

Another object of the present invention is to provide a three-phase transformer having one side connected in an A-winding arrangement wherein zero sequence coupling effects are substantially obviated.

Still another object is to provide an improved Y–A connected transformer having balanced reactance.

Further objects and advantages of the present invention will be apparent from the detailed description, reference being had to the accompanying drawings wherein preferred embodiments of the present invention are shown.

Figure 2:
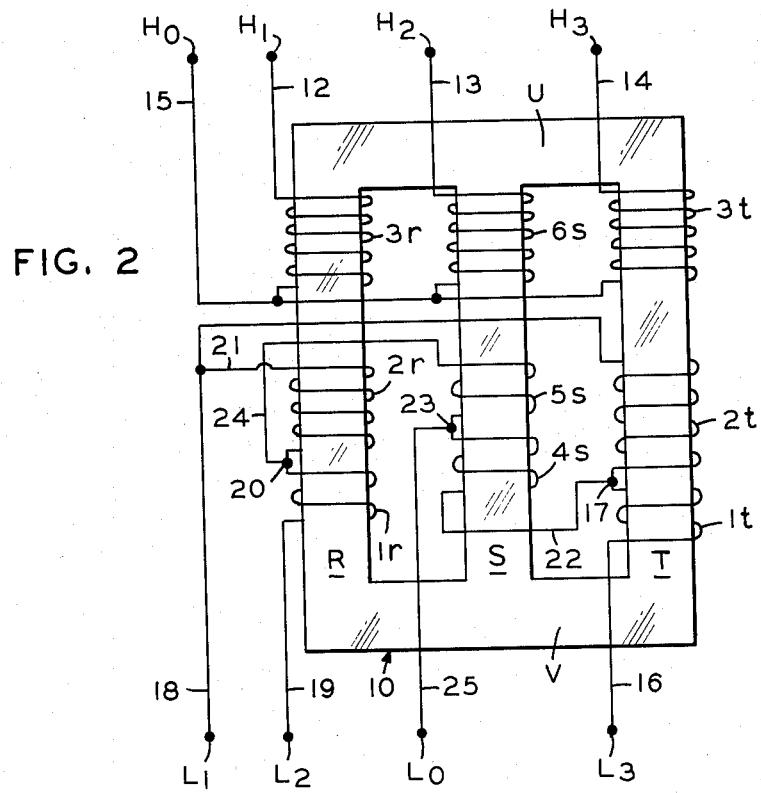
Figure 3:
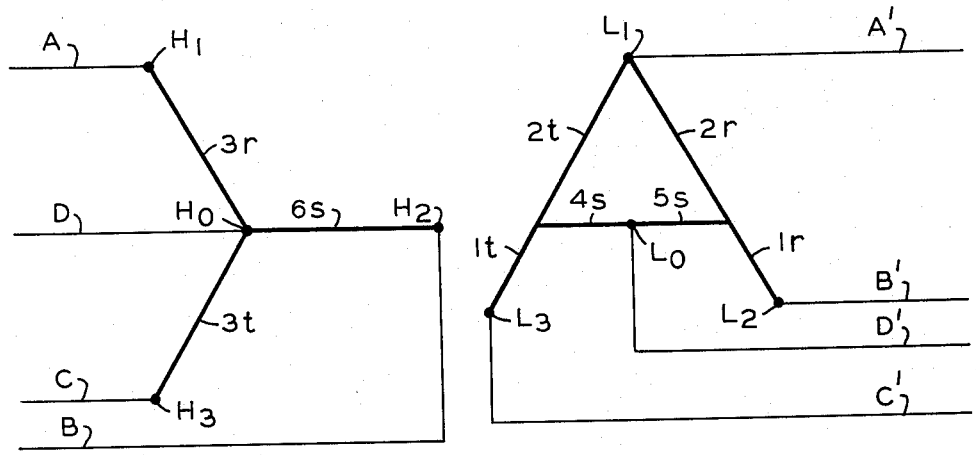

In the drawings, FIG. 1 is a cross-sectional diagrammatic view of a transformer embodying the present invention, FIG. 2 is a circuit connection diagram of the transformer of FIG. 1, and FIG. 3 is a vector diagram of the voltage phase relationships in the transformer shown in FIG. 1.

In accordance with the present invention, a three-phase transformer arrangement is provided having one of its winding sides arranged in an A-winding connection and with the windings of the transformer being arranged and related in a manner to obtain symmetrical or balanced percentage reactances in all phases of the transformer system.

The term "percentage reactance" is well understood and, as commonly used in the transformer literature, refers to the equivalent leakage reactance of given transformer windings as a percentage of rated volts. The symbol "%X" is used herein to represent percentage reactance, and in the equations which follow, where the symbol has numerical subscripts, the subscripts designate the particular pair of transformer windings under consideration.

In considering simple two winding transformers, percentage reactance is commonly defined as the reactive voltage drop at rated line current expressed as a percentage of the rated voltage when rated current flows. However, in the analysis of more complex transformer systems, such as in polyphase systems, percentage reactance may be conveniently considered as the reactive volt-ampere loss expressed as a percentage of a base kva. corresponding to the rated kva. or rated line current multiplied by rated line-to-neutral voltage, and it will be so considered herein wherever percentage reactance is indicated for a given pair of windings. In this way, percentage reactance is based on a common reference kva. for all of the various pairs of windings, thus simplifying the percentage reactance equations and the mathematical treatment thereof. This will hold true where the percentage reactance symbol, "%X," has numerical winding designations for subscripts; however, in the theoretical analysis of the transformer system as given herein, where the symbol "%X" does not have numerical subscripts, the percentage reactance is based on the particular output kva. under consideration.

The phrase "balanced percentage reactances in all phases of the transformer," or a similar such phrase, means herein that the three percentage reactance as determined by measuring between each line and each other line are equal to each other, and that the three percentage reactances as determined by measuring between each line and the neutral conductor are equal to each other.

Referring now to the drawings and especially to FIGS. 1 and 2, where there is shown for illustration a three-phase transformer embodying the present invention, the numeral 10 indicates a three-phase magnetic core structure which includes leg or core elements R, S, and T connected at their opposite ends by yoke members U and V. Positioned on the core elements R, S, and T are like phase windings 3r, 6s, and 3t, respectively. These windings have an equal number of turns and are wound in similar directions on their respective core elements with the conductors thereof being equal in cross-sectional area. Corresponding ends of the windings 3r, 6s, and 3t are connected for example, to high voltage terminals $H_1$, $H_2$, and $H_3$, respectively, by leads 12, 13, and 14, respectively, while the other ends thereof are connected together and to another lead 15 which is connected to a neutral terminal $H_0$. Thus in the illustrated embodiment, one winding side of the transformer, which includes phase windings 3r, 6s, and 3t, is connected in a Y-winding arrangement.

The other winding side of the transformer is connected in an A-winding arrangement and includes windings 1r and 2r on core element R, windings 4s and 5s on core element S, and windings 1t and 2t on core element T. The winding direction of each of the windings 1r, 2r, and 3r on core element R is the same, the winding direction of each of the windings 4s, 5s and 6s on element S is the same, and the winding direction of 1t and 2t is the same but their winding direction is opposite to that of winding 3t.

The winding 1t is shown with one end connected to a low voltage terminal $L_3$ by a lead 16 while the other end thereof is connected to one end of the winding 2t at the juncture 17. The other end of the winding 2t is connected to another low voltage terminal $L_1$ by a lead 18. The winding 1r has one end connected to a low voltage terminal $L_2$ by a lead 19, while the other end thereof is connected to one end of the winding 2r at a juncture 20. The other end of the winding 2r is connected by a lead 21 to lead 18 and the terminal $L_1$. One end of winding 4s is connected to the juncture 17 by a lead 22 while the other end thereof is connected to one end of the winding 5s at a juncture 23. The other end of winding 5s is connected to the juncture 20 by a lead 24. The juncture 23 is connected to a neutral terminal $L_0$ by a lead 25.

As seen more readily from the voltage vector diagram in FIG. 3, wherein winding designations respectively identify their corresponding voltage vectors, it will be apparent that the windings 2t, 4s, 5s and 2r are connected in a closed series loop to form the "delta" section of the A-winding and windings 1t and 1r are connected to the delta section and from the two "legs" of the A-winding. Since these windings comprise the A-winding side of the transformer they are conveniently referred to herein individually as A-windings. The two A-windings on each core element may be considered together as a single A-winding having a tap intermediate the ends thereof dividing the winding into winding sections. For example, the two A-windings on each of the outer core elements R and T may be considered a single A-winding having a tap dividing the winding into a two-thirds portion (2r or 2t) and a one-third portion (1r or 1t). Likewise the two A-windings on the center core element S may be considered as a single A-winding having a mid-tap dividing the winding into two equal portions 4s and 5s.

The windings 1r, 4s, 5s and 1t all have an equal number of winding turns. Windings 2r and 2t have an equal number of turns but each is provided with twice as many turns as each of the other A-windings. The cross-sectional size of the conductors of each of the windings 1r and 1t are normally made approximately twice as large as that of the conductors of each of the windings 2r and 2t. Windings 1r and 1t each normally carry twice as much current as each of the windings 2r and 2t, but since they have half as many turns as windings 2r and 2t, windings 1r, 2r, 1t and 2t all have the same number of ampere turns under balanced load conditions. Windings 4s and 5s in a normal design will have conductors of somewhat smaller cross-seciton than the conductors of 1r and 1t but normally greater than the conductors of 2r and 2t. For example, in a normal design the cross-sectional area of the conductors of 4s and 5s are about 87% of the cross-sectional area of the conductors of 1r and 1t.

In FIG. 3, the voltage vector for each A-winding is shown parallel to the voltage vector for its corresponding phase winding on the Y-winding side, and each winding side of the transformer is connected to a three-phase power line or distribution circuit. Terminals $H_1$, $H_2$ and $H_3$ are connected to lines A, B and C respectively, while the neutral terminal $H_0$ is connected to a neutral line conductor D. The terminals of the A-winding connection, $L_1$, $L_2$ and $L_3$ are shown connected to lines A', B' and C' respectively, with the neutral terminal $L_0$ connected to a neutral line conductor D'. It will be noted that windings 1t and 2t, which form one side of the A-winding arrangement, are connected in series between terminals $L_1$ and $L_3$; the windings 1r and 2r, which form the other side of the A-winding arrangement, are connected in series between terminals $L_1$ and $L_2$; and the windings 4s and 5s are connected in series between the two sides and form the horizontal section of the A-winding arrangement. Either side of the transformer may be connected to a three-phase power supply source and function as the primary winding while the other side may be connected to a load and function as the secondary winding.

The windings of the transformer are constructed and arranged in accordance with the present invention to provide symmetrical percentage reactances in all phases of the transformer system. This is accomplished according to the invention by constructing and arranging the windings of the transformer according to predetermined percentage reactance relationship discussed hereinafter. For convenience, the percentage reactance relationships and equations, and the arrangement of the windings of the transformer shown in the drawing for obtaining symmetrical percentage reactances, will first be described herein, and thereafter the operation and theoretical analysis of the transformer will be given.

One of the conditions for obtaining balanced or symmetrical percentage reactances in all phases of the transformer is that the percentage reactance between the windings 4s and 6s must be substantially equal to the percentage reactance between the windings 5s and 6s, or in other words, that the inductive coupling between the phase windings 6s and each of the A-windings 4s and 5s must be substantially the same. This relationship is expressed by the following percentage reactance equation wherein the core letter subscripts to the numerical windings designations are omitted:

$$\%X_{4-6} = \%X_{5-6} \tag{1}$$

The percentage reactance relationship expressed by the above Equation 1 can be obtained by arranging the windings on core element S so that windings 4s and 5s are similarly or symmetrically spaced from the winding 6s. For example, in the construction shown in FIG. 1, the windings on core element S are positioned with the windings 4s and 5s transposed at their midpoints so that the upper one-half of winding 4s and the lower one-half of windings 5s are equally spaced from the phase winding 6s, and with each of the other halves by windings 4s and 5s equally spaced from winding 6s. By positioning the windings on core element S in this manner, it will be apparent that the percentage reactances between the phase winding 6s and each of the windings 4s and 5s are the same as is required by Equation 1.

Another requirement for obtaining balanced or symmetrical percentage reactances in all phases of the transformer, is that the percentage reactance between windings 1r and 3r must be greater than the percentage reactance between windings 2r and 3r, and similarly, that the percentage reactance between windings 1t and 3t must be greater than the percentage reactance between windings 2t and 3t. It has been found that the percentage reactance between windings 1r and 3r should be equal to the percentage reactance between windings 2r and 3r plus one-third of the percentage reactance between windings 1r and 2r. Similarly, the percentage reactance between windings 1t and 3t should be equal to the percentage reactance between windings 2t and 3t plus one-third of the percentage reactance between windings 1t and 2t. Thus, the percentage reactance relationship, for the associated windings on core elements R and T respectively, is expressed by the following equation (core letters omitted):

$$\%X_{1-3} = \%X_{2-3} + \tfrac{1}{3}\%X_{1-2} \quad (2)$$

Corresponding windings on the outer core elements R and T are similar, and from symmetry it is apparent that the percentage reactance between any two windings on core element R should be substantially equal to the percentage reactance between the two corresponding windings on core element T, that is, the three percentage reactances for the three pairs of windings 1r and 2r, 1r and 3r, and 2r and 3r, should be substantially equal to the three percentage reactances for the three pairs of windings 1t and 2t, 1t and 3t, and 2t and 3t, respectively.

One arrangement of the windings on each of the core elements R and T that will satisfy the percentage reactance Equation 2 is shown in FIG. 1. Considering the windings on core element R, it is seen that each of the windings 1r and 2r is transposed at a point approximately one-third of its length from the lower end thereof so that two-thirds of the turns of winding 1r are further away from the phase winding 3r than two-thirds of the turns of winding 2r, and the other one-third of the turns of winding 1r are closer to winding 3r than the other one-third of the turns of winding 2r. Also, the two-thirds portion of winding 1r and the one-third portion of winding 2r are equally spaced from winding 3r, and the two-thirds portion of winding 2r and the one-third portion of winding 1r are equally spaced from winding 3r. The windings on core element T are shown arranged in the same manner as the windings on element R described above. With this arrangement the windings on elements R and T respectively will substantially satisfy the percentage reactance relationship expressed in Equation 2.

Still another condition for obtaining symmetrical percentage reactances is that the percentage reactance between phase winding 6s and its associated A-windings 4s and 5s together (in series or parallel with each other) should be approximately equal to or slightly less than the percentage reactance between each of the other phase windings and their respective associated A-windings together in order to obtain substantially symmetrical percentage reactances. More precisely, symmetrical percentage reactances are obtained when the windings are arranged and related to obtain the relationships indicated in the above Equations 1 and 2, and when the percentage reactance between windings 4s and 6s minus one-fourth the percentage reactance between windings 4s and 5s is equal to the percentage reactance between windings 2r and 3r minus one-third the percentage reactance between windings 1r and 2r, as well as to the percentage reactance between windings 2t and 3t minus one-third the percentage reactance between windings 1t and 2t (all based on a common reference kva.). These reactance relationships between windings on core element S and the windings on elements R and T, respectively, are simply expressed in the following single equation (core letter designations being omitted):

$$\%X_{4-6} - \tfrac{1}{4}\%X_{4-5} = \%X_{2-3} \tfrac{1}{3}\%X_{1-2} \quad (3)$$

When the windings are arranged in accordance with the relationship expressed by Equation 3, the percentage reactance between each phase winding and its associated A-windings together on each of the core elements R and T is only slightly greater than the percentage reactance between the phase winding and its associated A-windings on core element S. In other words, the windings on core element S should be slightly more closely inductively coupled than the windings on each of the core elements R and T.

In the illustrated embodiment of the invention, the radial spacing between the inner periphery of each of the phase windings and the outer periphery of their respective A-windings, as indicated at 26 and 27 in FIG. 1, is the same as the radial spacing, indicated at 28, between the phase winding 6 and its associated A-windings. This construction will substantially result in the transformer having reactances which satisfy Equation 3 since the cross-sectional areas of A-windings 4 and 5 will normally be slightly smaller than the cross-sectional areas of the other A-windings and this will result in a slightly closer coupling effect between the windings on core element S than between the windings on each of the core elements R and T.

Transformers having one of the winding sides arranged in an A-winding connection and constructed in accordance with Equations 1, 2 and 3 have symmetrical or balanced percentage reactances in all phases. With balanced percentage reactances, the line-to-line and line-to-neutral voltages are symmetrical or balanced, and the regulation of the system is symmetrical. Also, as will also be shown hereinafter, undesirable zero sequence coupling effects are substantially obviated, and a definite current distribution in the windings is obtained.

The following is a discussion of the operation and theoretical analysis of the Y-A transformer shown in the drawings. For simplicity sake, a one-to-one voltage transformation ratio will be assumed in the following discussion, and the letter "I" will be used to represent rated line current. In the operation of the transformer of the present invention under various stated load conditions, it will be assumed that a three-phase power supply source is connected to the lines A, B and C so that the Y-winding side of the transformer operates as the primary while the A-winding side operates as the secondary and is connected to supply the particular load under consideration. It will also be assumed that zero sequence current is not transformed to flow in the $H_0$ terminal, a condition that will be fully discussed hereinafter.

In general, the resistance components of transformer impedances are very small compared with the reactance components thereof, and the resistance components are therefore not considered in the discussion which follows.

From symmetry, it is obvious, that for balanced reactance conditions, Equation 1, $\%X_{4-6} = \%X_{5-6}$, is necessary, since the neutral for the A-winding side is at the junction of windings 4s and 5s. Thus, while Equation 1 will be considered in the following analysis, Equations 2 and 3 will be derived.

If a single-phase line-to-neutral load of unit volt amperes is connected across the low voltage terminals $L_0$ and $L_3$ with the other line-to-neutral and line-to-line phases open on the secondary side, the primary load current must flow in high voltage terminals $H_2$ and $H_3$ and none in $H_1$. Since the voltage $H_2$ to $H_3$ is $\sqrt{3}$ times the voltage $L_3$ to $L_0$, the primary current is $I$ divided by $\sqrt{3}$, or .577$I$; therefore, .577 unit volt-ampere flow through windings 6$s$ and 3$t$ and none through 3$r$ of the Y connection. As a result, there is no current flow in windings 1$r$, 2$r$, 2$t$ 5$s$ of the A-connection and 3$r$ of the Y-connection, but rated line current $I$ does flow through each of the windings 4$s$ and 1$t$, the only remaining path. This represents .577 unit volt-ampere in each of the windings 4$s$ and 1$t$ because the voltage of each of these windings is .577 unit volt. To find the percentage reactance between active windings on each core element, the products of the unit volt-amperes in opposite directions are added while those in the same direction are subtracted. Since only windings 1$t$ and 3$t$ on core element T and windings 4$s$ and 6$s$ on core element S are active in carrying current under these conditions and the volt-amperes of the active windings on each of these core elements are in opposite directions, only positive products are involved. Thus, in the active windings of each of these core elements the product is $.577 \times .577 = \frac{1}{3}$ and results in the following reactance equation:

$$\%X = \tfrac{1}{3}\%X_{1-3} + \tfrac{1}{3}\%X_{4-6} \qquad (4)$$

With a single-phase line-to-neutral load of unit volt amperes connected across the low voltage terminals $L_1$ and $L_0$ with the other line-to-neutral and line-to-line phases open, the primary current .577$I$ flows through each of windings 3$t$ and 3$r$ and none through the windings 6$s$ of the Y-winding. Primary current does not flow in 6$s$ because the currents flowing in 4$s$ and 5$s$ are in opposition. Current does not flow in windings 1$t$ and 1$r$ in the A-winding but the current $\frac{1}{2}I$ flows in each of the windings 4$s$, 5$s$, 2$t$ and 2$r$. The windings 2$r$ and 3$r$ on core element R and windings 2$t$ and 3$t$ on core element T each have .577 unit volt ampere and windings 4$s$ and 5$s$ on core element S each have .289 unit volt ampere, and the volt amperes of the active windings on each core element are in opposite directions which results in the following reactance equation:

$$\%X = .577\,(.577\%X_{2-3}) + .577\,(.577\%X_{2-3})$$
$$+ .289\,(.289\%X_{4-5})$$

which reduces to:

$$\%X = \tfrac{2}{3}\%X_{2-3} + \tfrac{1}{12}\%X_{4-5} \qquad (5)$$

If now a single-phase line-to-neutral load of unit volt amperes is connected across low voltage terminals $L_2$ and $L_0$ with the other line-to-neutral and line-to-line phases open on the secondary side, the primary current .577$I$ flows in each of windings 6$s$ and 3$r$ and none in winding 3$t$. As a result, current only flows in windings 1$r$ and 5$s$ of the A-winding. The windings 6$s$ and 3$r$ each have .577 unit volt ampere and windings 1$r$ and 5$s$ each have .577 unit volt ampere, the product of which is $.577 \times .577 = \frac{1}{3}$ for the active windings on each core element, and since the volt-amperes in each of said windings are in opposition, the percentage reactance is:

$$\%X = \tfrac{1}{3}\%X_{1-3} + \tfrac{1}{3}\%X_{5-6}$$

Combining this equation with Equation 1 results in the following, $$\%X = \tfrac{1}{3}\%X_{+1-3} + \tfrac{1}{3}\%X_{4-6}$$

which is Equation 4.

With a single-phase load connected line-to-line across low voltage terminals $L_1$ and $L_2$ with the other line-to-line and line-to-neutral phases open on the secondary side, the primary line current must flow in the winding 3$r$ and must also flow in either windings 3$t$ or 6$s$ or be divided therebetween. By assuming zero sequence currents to be obviated, as above, any current in windings 3$t$ and 6$s$ must be balanced by current in windings 2$t$, 4$s$ and 5$s$. In this condition, it is obvious that current flowing in 2$t$ must flow in 4$s$ and 5$s$ which would produce equal ampere turns on core elements T and S; therefore, the current must divide equally in windings 3$t$ and 6$s$ to have balanced ampere turns on core elements S and T. In addition, the above mentioned line-to-line voltage is $\sqrt{3}$ times the line-to-neutral voltage resulting in a load of $\sqrt{3}$ unit ampere volts. With this line-to-line connection, the primary current 1.155$I$ flows in winding 3$r$ and .577$I$ flows in each of windings 3$t$ and 6$s$ of the Y connection; and, as a result, a current $\frac{1}{2}I$ flows only in windings 2$t$, 5$s$, 4$s$ and 2$r$ of the A-winding while a current $I$ flows in the winding 1$r$. The winging 3$r$ has 1.155 unit volt amperes, windings 1$r$, 2$r$, 2$t$, 3$t$ and 6$s$ each have .577 unit volt ampere, and windings 4$s$ and 5$s$ each have .289 unit volt ampere. Since the currents in windings 1$r$ and 2$r$ are in the same direction and the current in the winding 3$r$ is opposite thereto, the percentage reactance between windings on core element R is:

$$\%X_R = .577\,(1.55\%X_{1-3}) + .577\,(1.55\%X_{2-3})$$
$$- .577\,(.577\%X_{1-2})$$

which reduces to:

$$\%X_R = \tfrac{2}{3}\%X_{1-3} + \tfrac{2}{3}\%X_{2-3} - \tfrac{1}{3}\%X_{1-2}$$

The percentage reactance between active windings on core element T is simply:

$$\%X_T = .577\,(5.77\%X_{2-3}) = \tfrac{1}{3}\%X_{2-3}$$

On core elements S, the winding 6$s$ has .577 unit volt ampere in an opposite direction to the .289 unit volt ampere of windings 4$s$ and 5$s$; therefore, the percentage reactance between windings on core element S is:

$$\%X_S = .577\,(.289\%X_{4-6}) + .577\,(.289\%X_{5-6})$$
$$- .289\,(.289\%X_{4-5})$$

and combining with Equation 1 results in:

$$\%X_S = \tfrac{1}{3}\%X_{4-6} - \tfrac{1}{12}\%X_{4-5}$$

Adding $\%X_R$, $\%X_T$, and $\%X_S$ and dividing by $\sqrt{3}$, because of the line-to-line connection, affords the following reactance equation:

$$\%X = \frac{\tfrac{2}{3}\%X_{1-3} + \%X_{2-3} + \tfrac{1}{3}\%X_{4-6} - \tfrac{1}{3}\%X_{1-2} - \tfrac{1}{12}\%X_{4-5}}{\sqrt{3}} \qquad (6)$$

If now a single-phase line-to-line load is connected across low voltage terminals $L_2$ and $L_3$ with the other line voltage phases and line-to-neutral phases open on secondary side, the current 1.155 flows in the winding 6$s$ and .577$I$ flows in each of windings 3$r$ and 3$t$ of the Y-winding since the load current and voltage are shifted 120°. As a result, current $I$ flows only in windings 1$t$, 4$s$, 5$s$ and 1$r$ of the A-winding. Since the winding 6$s$ has 1.155 unit volt amperes and windings 3$t$, 3$r$, 1$t$, 1$r$, 4$s$ and 5$s$ each have .577 unit volt ampere, the reactance of the active windings on core element R, T, and S respectively, is simply:

$$\%X_R = .577\,(.577\%X_{1-3}) - \tfrac{1}{3}\%X_{1-3}$$
$$\%X_T = .577\,(.577\%X_{1-3}) - \tfrac{1}{3}\%X_{1-3}$$
$$\%X_S = 1.155\,(.577\%X_{4-6}) + 1.155\,(.577\%X_{5-6})$$
$$- .577\,(.577\%X_{4-5})$$

and since windings 4$s$ and 5$s$ are alike, $$\%X_S = 2\,(\tfrac{2}{3}\%X_{4-6}) - \tfrac{1}{3}\%X_{4-5}$$

Adding $\%X_R$, $\%X_T$ and $\%X_S$ and dividing by $\sqrt{3}$, because of the line-to-line connection, affords the following reactance equation:

$$\%X = \frac{\tfrac{2}{3}\%X_{1-3} + \tfrac{4}{3}\%X_{4-6} - \tfrac{1}{3}\%X_{5-4}}{\sqrt{3}} \qquad (7)$$

For a single-phase line-to-line load connected across low voltage terminals $L_1$ and $L_3$, with the other line-to-line and line-to-neutral phases open on the secondary side, the current 1.155$I$ flows in the winding 3$t$ and .577$I$ flows in windings 3$r$ and 6$s$ of the Y-winding since the load current and voltage are shifted another 120°; therefore, a current ½I flows in windings 2t, 2r, 4s and 5s of the A-winding while a current I flows in the winding 1t. In view of the above, the winding 3t has 1.155 unit volt amperes, windings 1t, 2t, 2r, 3r and 6s each have .577 unit volt ampere, and windings 4s and 5s each have .289 unit volt ampere which are the corresponding figures to those previously employed in deriving reactance Equation 6; and, since the currents are also in the corresponding direction in the windings on various core elements, the same reactance Equation 6 is derived.

In order to equalize the percentage reactances between windings on each core element for various single-phase load conditions, reactance Equations 6 and 7, which were derived under line-to-line load conditions, are equated as follows:

$$\tfrac{2}{3}\%X_{1-3}+\%X_{2-3}+\tfrac{1}{3}\%X_{4-6}-\tfrac{1}{3}\%X_{1-2}-\tfrac{1}{12}\%X_{4-5}=\tfrac{2}{3}\%X_{1-3}+\tfrac{4}{3}\%X_{4-6}-\tfrac{1}{3}\%X_{4-5} \quad (8)$$

which reduces to:

$$\%X_{4-6}-\tfrac{1}{4}\%X_{4-5}=\%X_{2-3}-\tfrac{1}{3}\%X_{1-2} \quad (3)$$

Similarly, the reactance Equations 4 and 5, which were derived under line-to-neutral load conditions, are equated as follows:

$$\tfrac{1}{3}\%X_{1-3}+\tfrac{1}{3}\%X_{4-6}=\tfrac{2}{3}\%X_{2-3}+\tfrac{1}{12}\%X_{4-5} \quad (9)$$

which reduces to the following:

$$\%X_{1-3}=2\%X_{2-3}+\tfrac{1}{4}\%X_{4-5}-\%X_{4-6}$$

Substituting Equation 3 for the term $\tfrac{1}{4}\%X_{4-5}-\%X_{4-6}$ affords the following:

$$\%X_{1-3}=\%X_{2-3}+\tfrac{1}{3}\%X_{1-2} \quad (2)$$

Line-to-neutral and line-to-line single-phase load conditions on the Y-winding obviously provides a similar set of reactance equations which when equated result in the same Equations 2 and 3.

In view of the above, it is readily apparent that single-phase line-to-line and line-to-neutral loads cause symmetrical reactive drops across both line-to-line terminals and line-to-neutral terminals when the windings are arranged to provide reactances that substantially satisfy the original Equations 1, 2 and 3. Thus, under load conditions the percentage reactances as measured between each line and another line will be equal, and the percentage reactances as measured between each line and neutral will be equal. In this manner, the reactances of the Y-Δ transformer are balanced and the regulation is symmetrical since the voltage drops across the line-to-neutral phases are equal to each other, and the voltage drops across the line-to-line phases are equal to each other.

It will now be shown that zero sequence coupling effects are obviated in a transformer made in accordance with the present invention. It will be assumed in the following, for purposes of analysis, that the Y-connection is connected to another transformer, for example, a Y-delta connected transformer (not shown) so that a zero sequence current could flow in the Y-winding shown in the drawing if zero sequence currents were transformed through the balanced Y-Δ transformer. The letter "i" will be used to represent a zero sequence current flowing in the Y-winding of the transformer assuming for analysis sake that such zero sequence current could be transformed; however, it will be shown that such zero sequence coupling is obviated.

Assume now that a three-phase balanced voltage is supplied to the low voltage terminals $L_1$, $L_2$ and $L_3$ of the A-winding side, and that a single-phase load is connected from a line terminal to neutral on the A-winding side, for example, from terminals $L_3$ and $L_0$, and is drawing a zero sequence line current from the terminals $L_1$, $L_2$ and $L_3$ of I amperes while the neutral low voltage terminal $L_0$ carries a zero sequence current of 3I amperes.

If there is no zero sequence current transformed, that is if i=0, then the currents in the various windings are as follows:

I amperes in 1r flowing toward terminal $L_2$,
½I ampere in 2r flowing toward $L_1$,
1½I amperes in 5s flowing away from $L_0$,
1½I amperes in 4s flowing away from $L_0$,
I amperes in 1t flowing toward $L_3$, and
½I ampere in 2t flowing toward $L_1$.

If it now be assumed, for purposes of analysis, that a zero sequence current i in the Y-winding is not zero, then there will be an additional current .866i circulating in the delta portion of the A-winding. If the current i flows in each winding 3r, 6s and 3t toward the neutral terminal $H_0$, then .866i will flow in winding 2r toward terminal $L_1$, in winding 2t away from terminal $L_1$, in winding 4s toward terminal $L_0$, and in winding 5s away from terminal $L_0$. Combining the abovementioned currents for the windings and multiplying by the per unit volts based on the line-to-neutral voltage, results in the following volt-amperes for the various windings:

Per unit volt-amperes in 1r=.577I
Per unit volt-amperes in 2r=.577I+i
Per unit volt-amperes in 5s=.866I+.5i
Per unit volt-amperes in 4s=.866I−.5i
Per unit volt-amperes in 1t=.577I
Per unit volt-amperes in 2t=.577I−i Adding the percentage reactances for the various winding pairs on each element and multiplying by ⅓, because the output is 3 times the base kva., results in the following zero sequence percentage reactance (%X) equation:

$$\%X_0=3\ .577Ii\%X_{1-3}+.577I(.577I+i)\%X_{1-2}+(.577I+i)i\%X_{2-3}+(.866I+.5i)(.866I-.5i)\%X_{4-5}-(.866I-.5i)i\%X_{4-6}+(.866I+.5i)i\%X_{5-6}-.577Ii\%X_{1-3}-(.577I-i)i\%X_{2-3}+.577I(.577I-i)\%X_{1-2}$$

which in turn reduces to:

$$\%X_0=\tfrac{1}{3}i^2(\tfrac{1}{2}\%X_{4-6}+\tfrac{1}{2}\%X_{5-6}+2\%X_{2-3}-\tfrac{1}{4}\%X_{4-5})+i(.866I\%X_{5-6}-.866I\%X_{4-6})+\tfrac{2}{3}I^2\%X_{1-2}+\tfrac{3}{4}I^2\%X_{4-5} \quad (10)$$

In Equation 10 the term $$i^2(\tfrac{1}{2}\%X_{4-6}+\tfrac{1}{2}\%X_{5-6}+2\%X_{2-3}-\tfrac{1}{4}\%X_{4-5})$$

will always be positive for any value of i other than zero because the negative portion ($-\tfrac{1}{4}\%X_{4-5}$) is numerically smaller than the sum of the positive portions of the coefficient of $i^2$. Since $\%X_{4-6}=\%X_{5-6}$, Equation 1, the term $i(.866I\%X_{4-6}-.866I\%X_{4-5})$ is zero and can be dropped from the equation, and the complete zero sequence reactance, $\%X_0$, of the transformer is a minimum when i=0. Since the current flows in such a way as to find the lowest reactance, the value of i will be zero, thus indicating that zero sequence currents are not transformed in the balanced Y-Δ transformer of the present invention under these conditions.

It can similarly be shown by theory, however, it is believed obvious from the above, that if zero sequence currents flow in the Y-winding when used as the primary, that zero sequence currents, although transformed to the A-winding, will not affect the phase or line terminal currents since these zero sequence currents will only circulate in the delta portion of the A-winding as in the above case. From the above, it is readily apparent that zero sequence coupling effects between the Y-winding and A-winding are obviated when the percentage reactance of all phases of the transformer are symmetrical. The current distribution in the transformer of the present invention is definite under all conditions since the percentage reactances are balanced in all phases and zero sequence coupling effects are obviated.

Although a single three-phase transformer is shown in the drawings for illustration, it will be apparent that three single-phase transformers, each including a single-phase transformer core element, a phase winding, and associated A-windings, may be used if desired.

While a Y-A transformer winding arrangement has been shown and described for purposes of illustration it will be obvious to those skilled in the art that other winding connections in cooperation with an A-winding connection may be used. For example, it is obvious that the winding 3r, 6s and 3t can be connected to form a delta winding connection instead of the Y connection shown. Furthermore, transformers made in accordance with the invention may be used in power systems where a neutral connection is not needed or required on either side of the transformer although transformers of the present invention are particularly well adapted for use where neutrals are required on both sides of the system.

While a specific transformer construction is shown in FIG. 1 for illustration, other transformer constructions can be used to obtain the benefits of the present invention. For example, the A-windings on each core element may be interleaved to form a single winding stack with the associated phase winding concentrically mounted therewith or all of the windings on each core element, including the phase winding, may be interleaved to provide a single winding stack for each core element. Also, it will be apparent that various types of winding sections or coils, such as the disc-type, pancake-type, helical-type, or combinations thereof, may be used in the production of transformer made in accordance with the present invention.

Since the design and arrangement of windings for obtaining predetermined percentage reactance relationships are well known to those skilled in the transformer art, the equations given herein are sufficient to enable those skilled in the art to design and build transformers of various types of constructions and obtain the benefits of the present invention.

It is to be understood that the foregoing description and accompanying drawings have been given only by way of illustration and example, and that changes and alterations in the present disclosure, which will be apparent to one skilled in the art, are contemplated as within the scope of the present invention which is limited only by the claims which follow.

What I claim is:

1. A transformer for three-phase operation comprising first, second, and third core elements, a plurality of phase windings including two phase windings 3 disposed on said first and second core elements, respectively, and a phase winding 6 disposed on said third core element, said phase windings being connected in a Y-winding arrangement for connection with a three-phase distribution system, and a plurality of windings connected in an A-winding arrangement for connection to a three-phase four-wire system having three phase wires and a neutral wire, said last named plurality of windings including a first winding 1 and a first winding 2 disposed on said first core element and with one end of each connected together at a first juncture, a second winding 1 and a second winding 2 disposed on said second core element with one end of each connected together at a second juncture, and windings 4 and 5 disposed on said third core element with one end of each adapted for connection to said neutral wire and with the other ends thereof connected to said first and second junctures, respectively, each of the other ends of said windings 2 being adapted for connection to one of said phase wires, the other ends of said windings 1 being adapted for connection to the other two phase wires, respectively, each of said windings 1, 4, and 5 having substantially the same number of turns, each of said windings 2 having substantially the same number of turns and substantially twice as many turns as each of said windings 1, 4 and 5, said windings being arranged to substantially satisfy the percentage reactance formulas:

$\%X_{4-6} = \%X_{5-6}$,
$\%X_{1-3} = \%X_{2-3} + \frac{1}{3}\%X_{1-2}$ (on said first and second core elements, respectively) and
$\%X_{4-6} - \frac{1}{4}\%X_{4-5} = \%X_{2-3} - \frac{1}{3}\%X_{1-2}$ (on said first and second core elements, respectively)

wherein said $\%X_{4-6}$, $\%X_{5-6}$, $\%X_{1-3}$, $\%X_{2-3}$, $\%X_{1-2}$ and $\%X_{4-5}$ respectively represent the percentage reactance between the windings represented by the numerical subscripts to the percentage reactance symbol $\%X$.

2. A transformer for three-phase operation comprising first, second and third core elements, a plurality of phase windings including two phase windings 3 disposed on said first and second core element, respectively, and a phase winding 6 disposed on said third core element, said phase windings being interconnected for three-phase operation, and a plurality of windings connected in an A-winding arrangement for connection to a three-phase electrical system including three-phase wires, said last named plurality of windings including a first winding 1 and a first winding 2 disposed on said first core element and with one end of each connected together at a first juncture, a second winding 1 and a second winding 2 disposed on said second core element with one end of each connected together at a second juncture, and windings 4 and 5 disposed on said third core element with one end of each connected together at a third juncture and with the other ends thereof connected to said first and second junctures, respectively, said third juncture serving as a neutral point for said A-winding arrangement, each of the other ends of said windings 2 being adapted for connection to one of said phase wires, the other ends of said windings 1 being adapted for connection to the other two phase wires, respectively, each of said windings 1, 4 and 5 having substantially the same number of turns, each of said windings 2 having substantially the same number of turns and substantially twice as many turns as each of said windings 1, 4 and 5, said windings being arranged to substantially satisfy the percentage reactance formulas:

$\%X_{4-6} = \%X_{5-6}$,
$\%X_{1-3} = \%X_{2-3} + \frac{1}{3}\%X_{1-2}$ (on said first and second core elements, respectively) and
$\%X_{4-6} - \frac{1}{4}\%X_{4-5} = \%X_{2-3} - \frac{1}{3}\%X_{1-2}$ (on said first and second core elements, respectively)

wherein said $\%X_{4-6}$, $\%X_{5-6}$, $\%X_{1-3}$, $\%X_{2-3}$, $\%X_{1-2}$, and $\%X_{4-5}$ respectively represent the percentage reactance between the windings represented by the numerical subscripts to the percentage reactance symbol $\%X$.

References Cited by the Examiner

UNITED STATES PATENTS 1,869,602  5/1932  Taylor _____ 323—44

FOREIGN PATENTS 639,094  3/1928  France.

LARAMIE E. ASKIN, *Primary Examiner.*

ROBERT K. SCHAEFER, *Examiner.*

T. J. KOZMA, *Assistant Examiner.*

UNITED STATES PATENT OFFICE
CERTIFICATE OF CORRECTION

Patent No. 3,258,725                    June 28, 1966

Otis T. Farry

It is hereby certified that error appears in the above numbered patent requiring correction and that the said Letters Patent should read as corrected below.

Column 3, line 61, for "from" read -- form --; column 6, equation "(3)" should appear as shown below instead of as in the patent:

$$\%X_{4-6} - 1/4\%X_{4-5} = \%X_{2-3} - 1/3\%X_{1-2}$$

column 7, line 62, the equation should appear as shown below instead of as in the patent: $\%X = 1/3\%X_{1-3} + 1/3\%X_{4-6}$ column 8, lines 17 and 18, the equation should appear as shown below instead of as in the patent:

$$\%X_R = .577(1.155\%X_{1-3}) + .577(1.155\%X_{2-3}) - .577(.577\%X_{1-2})$$

lines 56 and 57, the equation should appear as shown below instead of as in the patent:

$$\%X_R = .577(.577\%X_{1-3}) = 1/3\%X_{1-3}$$

$$\%X_T = .577(.577\%X_{1-3}) = 1/3\%X_{1-3}$$

same column 8, equation "(7)" should appear as shown below instead of as in the patent:

$$\%X = \frac{2/3\%X_{1-3} + 4/3\%X_{4-6} - 1/3\%X_{4-5}}{\sqrt{3}}$$

column 10, lines 34 to 37, the equation should appear as shown below instead of as in the patent:

$$\%X_o = 1/3[-.577\text{i}\%X_{1-3} + .577\text{I}(.577\text{I}+\text{i})\%X_{1-2} + (.577\text{I}+\\ \text{i})\text{i}\%X_{2-3} + (.866\text{I}+.5\text{i})(.866\text{I}-.5\text{i})\%X_{4-5} - (.866\text{I}-.5\text{i})\text{i}\%X_{4-6}\\ +(.866\text{I}+.5\text{i})\text{i}\%X_{5-6} + .577\text{I}\text{i}\%X_{1-3}\\ -(.577\text{I}-\text{i})\text{i}\%X_{2-3} + .577\text{I}(.577\text{I}-\text{i})\%X_{1-2}]$$

equation "(10)" should appear as shown below instead of as in the patent:

$$\%X_o = 1/3[i^2(1/2\%X_{4-6} + 1/2\%X_{5-6} + 2\%X_{2-3} - 1/4\%X_{4-5})$$
$$+ i(.866I\%X_{5-6} - .866I\%X_{4-6})$$
$$+ 2/3I^2\%X_{1-2} + 3/4I^2\%X_{4-5}]$$

same column 10, line 50, for "i$(.866I\%X_{4-6} - .866I\%X_{4-5})$" read -- i$(.866I\%X_{5-6} - .866I\%X_{4-6})$ --; column 12, line 20, for "first and second core element," read -- first and second core elements, --.

Signed and sealed this 9th day of January 1968.

(SEAL)
Attest:

EDWARD M. FLETCHER, JR.
Attesting Officer

EDWARD J. BRENNER
Commissioner of Patents